(12) United States Patent
Ozcan et al.

(10) Patent No.: US 10,974,463 B2
(45) Date of Patent: Apr. 13, 2021

(54) THERMOSET COMPOSITE HAVING THERMOPLASTIC CHARACTERISTICS

(71) Applicant: UT-Battelle, LLC, Oak Ridge, TN (US)

(72) Inventors: Soydan Ozcan, Oak Ridge, TN (US); Halil L. Tekinalp, Knoxville, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 0 days.

(21) Appl. No.: 16/687,140

(22) Filed: Nov. 18, 2019

(65) Prior Publication Data

US 2020/0087533 A1 Mar. 19, 2020

Related U.S. Application Data

(62) Division of application No. 15/182,669, filed on Jun. 15, 2016, now abandoned.

(60) Provisional application No. 62/180,181, filed on Jun. 16, 2015.

(51) Int. Cl.
| | | |
|---|---|---|
| *B32B 27/18* | (2006.01) | |
| *B32B 27/30* | (2006.01) | |
| *B32B 27/36* | (2006.01) | |
| *B32B 27/38* | (2006.01) | |
| *B29C 70/02* | (2006.01) | |
| *B29C 64/118* | (2017.01) | |
| *C09D 101/00* | (2006.01) | |
| *C09D 163/00* | (2006.01) | |
| *C09D 167/06* | (2006.01) | |
| *C09D 167/07* | (2006.01) | |
| *C08L 63/00* | (2006.01) | |
| *C08G 59/24* | (2006.01) | |
| *C08G 59/50* | (2006.01) | |
| *B33Y 10/00* | (2015.01) | |
| *B33Y 70/00* | (2020.01) | |
| *B29K 63/00* | (2006.01) | |
| *B29K 31/00* | (2006.01) | |
| *B29K 67/00* | (2006.01) | |
| *B29K 105/12* | (2006.01) | |
| *B29K 201/00* | (2006.01) | |
| *B29K 105/00* | (2006.01) | |

(52) U.S. Cl.
CPC ............ *B29C 70/02* (2013.01); *C08G 59/245* (2013.01); *C08G 59/5033* (2013.01); *C08L 63/00* (2013.01); *C09D 163/00* (2013.01); *B29C 64/118* (2017.08); *B29K 2031/00* (2013.01); *B29K 2063/00* (2013.01); *B29K 2067/00* (2013.01); *B29K 2105/0005* (2013.01); *B29K 2105/122* (2013.01); *B29K 2105/124* (2013.01); *B29K 2201/00* (2013.01); *B33Y 10/00* (2014.12); *B33Y 70/00* (2014.12); *C08L 2205/16* (2013.01)

(58) Field of Classification Search
None
See application file for complete search history.

(56) References Cited

U.S. PATENT DOCUMENTS

| | | | |
|---|---|---|---|
| 10,266,968 B2 * | 4/2019 | Yamato | C08L 33/10 |
| 2016/0152811 A1 * | 6/2016 | Gardner | B29C 64/165 |
| | | | 524/35 |
| 2016/0200934 A1 * | 7/2016 | Meredith, III | C09D 163/00 |
| | | | 427/386 |
| 2016/0319467 A1 * | 11/2016 | Yamato | C08L 9/06 |

FOREIGN PATENT DOCUMENTS

WO WO-2015098543 A1 * 7/2015 ............. C08L 33/10

* cited by examiner

*Primary Examiner* — Michael J Feely
(74) *Attorney, Agent, or Firm* — Lempia Summerfield Katz LLC (57) ABSTRACT

A composite composition includes a thermoset resin and about 3 wt. % to about 35 wt. % of at least one material selected from the group consisting of cellulose nanofibrils (CNF), micro-sized cellulose fibers (MFC), and cellulose nanocrystals (CNC) dispersed therein as measured with respect to the overall weight of the composite composition. The cellulose nanofibrils and/or nanocrystals have an average diameter of about 5 nm to about 500 nm and an average aspect ratio in the range of about 5:1 to about 500:1. The cellulose micro-sized fibers have an average diameter of about 5 μm to about 100 μm and an average aspect ratio in the range of about 5:1 to about 250:1.

19 Claims, 6 Drawing Sheets

THERMOSET COMPOSITE HAVING THERMOPLASTIC CHARACTERISTICS

CROSS-REFERENCE TO RELATED APPLICATIONS

This application is a divisional of U.S. patent application Ser. No. 15/182,669 filed on Jun. 15, 2016, which claims priority to U.S. Provisional Patent Application No. 62/180,181 filed on Jun. 16, 2015, which are incorporated herein in their entirety by reference.

STATEMENT REGARDING FEDERALLY SPONSORED RESEARCH

The United States Government has rights in this invention pursuant to contract no. DE-AC05-00OR22725 between the United States Department of Energy and UT-Battelle, LLC.

FIELD

The present disclosure relates to composite compositions having a thermoset resin and articles formed therefrom. More specifically, the present disclosure relates to thermoset resin composite systems comprising a thermoset resin and one or more cellulose nanofibers (CNF), micro-sized cellulose fibers (MFC), and cellulose nanocrystals (CNC) dispersed therein.

BACKGROUND

The statements in this section merely provide background information related to the present disclosure and may not constitute prior art.

Thermoplastic materials can be reprocessed and reshaped by reheating the solidified material to a softening or melting temperature to enable the reprocessing and/or reshaping by plastic formation, and then cooling the reprocessed and/or reshaped material to achieve a solid state. For example, thermoplastic materials can be reheated and extruded through a nozzle in a three-dimensional, free-form, moldless deposition, such as that found in a 3-D printing process, to make sundry products, including automobiles.

Thermoset materials, by definition, once solidified, cannot be reheated to achieve softening or melting. Therefore, processing of thermoset materials must take place before such materials reach the solid state. It is difficult to 3-D print thermoset materials because such materials generally are in a liquid state before curing (setting) takes place; the material will not hold a free-form, dimensionally stable shape, but will flow. Once the material cures, shaping by plastic deformation is not possible. However, thermoset materials could offer multiple advantages over thermoplastic materials if used for the formation various 3-D printed products. More specifically, thermoset materials are more resistant to solvents and corrosives, as well as providing better fatigue strength, adhesion properties, and surface finish.

SUMMARY

The present disclosure generally provides a composite composition comprising, consisting essentially of, or consisting of a thermoset resin and about 3 wt. % to about 35 wt. % of at least one material selected from the group consisting of cellulose nanofibrils (CNF), micro-sized cellulose fibers (MFC), and cellulose nanocrystals (CNC) dispersed therein as measured with respect to the overall weight of the composite composition. The cellulose nanofibrils and/or nanocrystals have an average diameter of about 5 nm to about 500 nm and an average aspect ratio in the range of about 5:1 to about 500:1. The cellulose micro-sized fibers have an average diameter of about 5 μm to about 100 μm and an average aspect ratio in the range of about 5:1 to about 250:1.

According to one aspect of the present disclosure, the composite composition may comprise a thermoset resin. Alternatively, the thermoset resin may be selected from the group consisting of epoxy resins, vinyl ester resins, and polyester resins. When desirable, the composite composition may further comprise a curing agent. Alternatively, the composite composition may comprise a mixture of an epoxy resin and a curing agent. The curing agent may be selected to be, without limitation, a polyamide, an amidoamine, an aliphatic amine, a cycloaliphatic amine, or a mixture thereof.

According to another aspect of the present disclosure, the composite composition may be uncured or cured. The cure of the composite composition may be accomplished at ambient or room temperature or by heating the thermoset resin for a period of time such that the thermoset resin is at least partially cured; alternatively, substantially cured.

The thermoset resin in the composite composition may be a water-based thermoset resin. The composite composition may further comprise one or more additional additives, including but not limited to, solvents, cure accelerators, cure inhibitors, additional polymers, pigments or colorants, fillers, dispersants or surfactants, coalescent agents, pH neutralizing agents, plasticizers, defoamers, thickeners, biocides, co-solvents, rheology modifiers, wetting or spreading agents, leveling agents, conductive additives, adhesion promoters, anti-blocking agents, anti-cratering agents or anti-crawling agents, antifreezing agents, corrosion inhibitors, anti-static agents, flame retardants, optical brighteners, UV absorbers or other light stabilizers, chelating agents, flattening agents, flocculants, humectants, insecticides, lubricants, odorants, oils, waxes or anti-slip aids, soil repellants, and stain resistant agents.

According to yet another aspect of the present disclosure, a method of making an article using the composite composition described above and further defined herein is provided. This method generally comprises the steps of forming a composite composition comprising an uncured thermoset resin and about 3 wt. % to about 35 wt. % of at least one material selected from the group consisting of cellulose nanofibrils (CNF), micro-sized cellulose fibers (MFC), and cellulose nanocrystals (CNC) dispersed therein; depositing the composite composition to fabricate a green article; and allowing the green article to remain at ambient temperature or to be heated to a predetermined temperature and for a predetermined time to cure the thermoset resin, thereby, making the article.

The step of forming the composite composition may comprise the steps of: providing the uncured thermoset resin; providing the cellulose nanofibrils (CNF), micro-sized cellulose fibers (MFC), and/or cellulose nanocrystals (CNC); optionally, providing a curing agent; and mixing the thermoset resin and the optional curing agent with the CNF, MFC, and/or CNC to form the composite composition.

The step of depositing the composite composition to fabricate a green article may comprise a 3-D printing process. In this step, the composite composition can be processed and/or shaped with or without the inclusion of a curing agent.

According to yet another aspect of the present disclosure, an article of manufacture that comprises the composite composition described above and further defined herein is provided. The composite composition that forms the article is at least partially cured; alternatively, the composite composition is substantially cured.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

For a better understanding of the present invention, together with other and further objects, advantages and capabilities thereof, reference is made to the following disclosure and appended claims in connection with the above-described drawings.

DETAILED DESCRIPTION

The present disclosure generally relates to a composite composition comprising a thermoset resin and about 3 wt. % to about 35 wt. % of at least one material selected from the group consisting of cellulose nanofibers or nanofibrils (CNF), micro-sized cellulose fibers (MFC), and cellulose nanocrystals (CNC) dispersed therein as measured with respect to the overall weight of the composite composition. The composite composition is capable of being applied to a substrate by any process, including, but not limited to an extrusion process and/or a printing process.

The cellulose nanofibers (CNF) and/or nanocrystals (CNC) have an average diameter of about 5 nanometers (nm) to about 500 nanometers (nm) and an average aspect ratio of length to width that is in the range of about 5:1 to about 500:1. Alternatively, the CNF and/or CNC may have an average diameter in the range of about 5 nm to about 250 nm; alternatively, less than about 100 nm. Alternatively, the CNF and/or CNC may have an average aspect ratio of about 7:1 to about 200:1; alternatively, in the range of about 10:1 to about 100:1. The micro-sized cellulose fibers (MFC) have an average diameter of about 5 μm to about 100 μm and an average aspect ratio of length to width that is in the range of about 5:1 to about 250:1. Alternatively, the MFC may have an average diameter in the range of about 10 μm to about 70 μm; alternatively, less than about 30 μm. Alternatively, the CNF and/or CNC may have an average aspect ratio in the range of about 5:1 to about 150:1; alternatively, in the range of about 5:1 to about 30:1.

The length of the cellulose nanofibers or nanocrystals may range from about 50 nm to about 5,000 nm; alternatively, between about 100 nm to about 1,000 nm, such that the aspect ratio between the fiber length to diameter are within the range specified above. Similarly, the length of the MFC fibers may range from about 50 μm to about 750 μm; alternatively, between about 150 μm to about 550 μm, such that the aspect ratio between the fiber length to diameter are within the range specified above.

The thermoset resins are generally in liquid form at room temperature until cured, and once cured they solidify and cannot be re-melted in order to be processed again. However, the use of a thermoset resins provide several advantages over thermoplastic resins, which lose their mechanical properties when heated above their glass transition temperature. In addition, thermoset resins offer better chemical and temperature resistance, higher modulus, and a better surface finish when compared to thermoplastic resins.

The high surface area and fibril form of nano- and micro-sized cellulose fibers and crystals can effectively modify the rheological behavior exhibited by a liquid thermoset resin, thereby, rendering the resulting composite composition suitable for processing similar to thermoplastic polymers, while maintaining the many benefits associated with thermoset resins. The composite composition may comprise a thermoset resin and about 3 wt. % and about 35 wt. % of cellulose nanofibrils (CNF), cellulose nanocrystals (CNC), micro-sized cellulose fibers (MFC), or a mixture thereof dispersed therein or integrated therewith. Alternatively, the composite composition includes the thermoset resin and between about 3 wt. % to about 30 wt. %; alternatively between about 4 wt. % and about 20 wt. %; alternatively, less than 30 wt. %; alternatively, greater than about 4 wt. % of the CNF, CNC, MFC, or mixture thereof.

The thermoset resin used in to form the composite composition may be any thermoset resin. Alternatively, the thermoset resin may be selected from the group consisting of epoxy resins, vinyl ester resins, and polyester resins. Alternatively, the thermoset resin is an epoxy resin. Several specific examples of epoxy resins, include but are not limited to, bisphenol A epoxy resins, bisphenol F epoxy resins, Novolac epoxy resins, aliphatic epoxy resins, glycidylamine epoxy resins, and mixtures thereof.

The vinyl ester resins may include, without limitation, a resin formed by the esterification of an epoxy resin with an unsaturated monocarboxylic acid. When desirable, the vinyl ester resin may be dissolved in a reactive solvent, such as a styrene, in a concentration of about 30 wt. % to about 50 wt. %.

Finally, the polyester resins may include, but not be limited to, resins formed from the reaction of dibasic organic acids and polyhydric alcohols or polyols. A specific example of a polyol includes, without limitation, glycols, such as ethylene glycol. Specific examples of dibasic organic acids include, but are not limited to, phthalic acid and maleic acid.

When desirable a curing agent may be incorporated into the composite composition along with the thermoset resin. The amount of the curing agent incorporated into the composite composition may be determined by the number of reactive groups present in the thermoset resin. The curing agent may be incorporated such that there is a stoichiometric ratio between the reactive functionality in the curing agent to the reactive groups present in the thermoset resin. Alternatively, the ratio of reactive functionality in the curing agent to the reactive groups in the thermoset resin may be off-stoichiometry when partial cure is desired. The curing agent may be, without limitation, an amine, an acid, an acid anhydride, a phenol, an alcohol, and a thiol, as well as mixtures thereof. Alternatively, the curing agent is a polyamide, an amidoamine, an aliphatic amine, a cycloaliphatic amine, or a mixture thereof. When desirable, the curing agent may be an organic peroxide.

The composite composition may be cured or uncured. The cure of the thermoset resin may be accomplished, without limitation, by allowing the thermoset resin to remain at ambient or room temperature or \by heating the composite composition to a predetermined temperature for a predetermined amount of time. The time and temperature may be predetermined or selected based on the composition of the thermoset resin. The temperature and time may be selected such that the thermoset resin at least partially cures. Alternatively, the temperature and time is selected such that the thermoset resin is substantially cured. The temperature may be any temperature greater than 2° C., alternatively, greater than 4° C.; alternatively, greater than 20° C. Alternatively, the temperature may range from about 2° C. to about 100° C., from about 2° C. to about 80° C., or about 2° C. to about 50° C. for about 4 minutes to greater than 120 minutes; alternatively from about 4° C. to about 80° C. or about 4° C. to about 40° C. for a period of time from about 5 minutes to about 75 minutes.

The composite composition may further comprise one or more additional additives. These additional additives may include, but not be limited to, solvents, cure accelerators, cure inhibitors, additional polymers, pigments or colorants, fillers, dispersants or surfactants, coalescent agents, pH neutralizing agents, plasticizers, defoamers, thickeners, biocides, co-solvents, rheology modifiers, wetting or spreading agents, leveling agents, conductive additives, adhesion promoters, anti-blocking agents, anti-cratering agents or anti-crawling agents, antifreezing agents, corrosion inhibitors, anti-static agents, flame retardants, optical brighteners, UV absorbers or other light stabilizers, chelating agents, flattening agents, flocculants, humectants, insecticides, lubricants, odorants, oils, waxes or anti-slip aids, soil repellants, and stain resistant agents.

Figure 1:
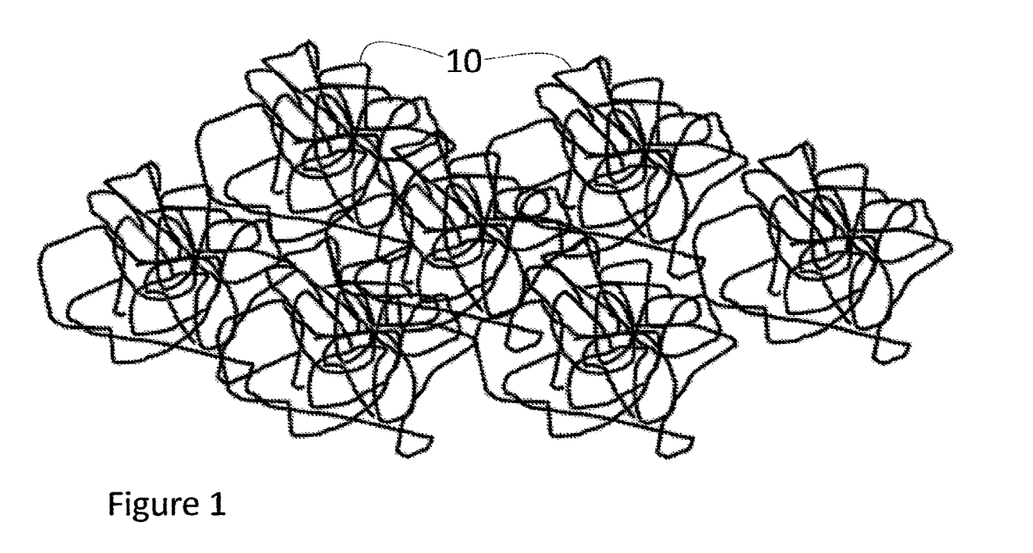
FIG. 1 is a conceptual, schematic diagram showing chopped dry cellulose nanofibrils.

Referring to FIG. 1, a conceptual, schematic illustration of chopped dry cellulose nanofibers 10 is shown. Freeze-dried cellulose nanofibers 10, which are chopped using a blade-mill, provide entangled structures and strong hydrogen bonding, giving them characteristics of micro-sponges with high liquid absorption capacity. When desirable, the diameter of fibrils that constitute the chopped bundles may be mostly below 100 nm, while the length thereof may be mostly above one micrometer, thereby providing an aspect ratio of 10 or more.

Dry cellulose nanofibers or nanofibrils (CNF), cellulose nanocrystals (CNC), or micro-sized cellulose fibers (MFC) are hydrophilic in nature but they can also absorb significant amounts of various resins in addition to water. The nano/micro-structure and the bulk density of the CNF, CNC, and MFC depend on the preparation and drying procedure. One skilled-in-the-art will understand that, since cellulose nanofibrils, nanocrystals, and micro-sized fibers prepared by different methods can impart differences in the rheological properties and processability exhibited by a composite composition, some routine experimentation will be required to achieve the desired rheological properties and processability of the thermoset resin depending upon the intended use or application for the composite composition.

Chopped dry cellulose nanofibrils, micro-sized fibers, and/or nanocrystals can be mixed with a liquid thermoset resin to form a network in the composite composition having dimensional stability and integrity. The resulting composite composition exhibits behavior that is unexpectedly similar to the behavior of molten thermoplastic materials. The mixing of the thermoset resin and the CNF, CNC, or MFC may be accomplished using any conventional industrial mixing method, including, but not limited to the use of a planetary mixer, a high speed shear disperser, a rotor/stator mixer, a ball mill, or an attritor mill, to name a few.

Figure 2A:
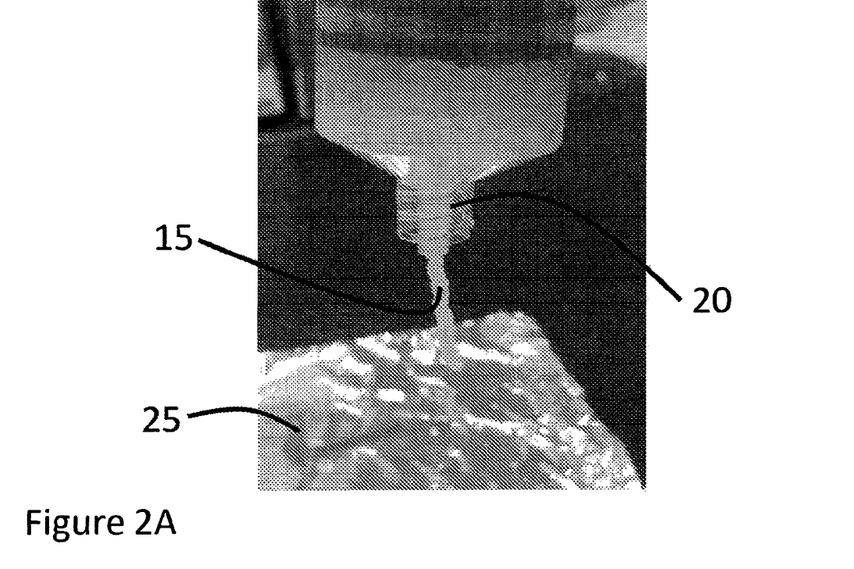
FIG. 2A is a photomicrograph of the composite composition formed according to the teachings of the present disclosure being extruded through a nozzle.
Figure 2B:
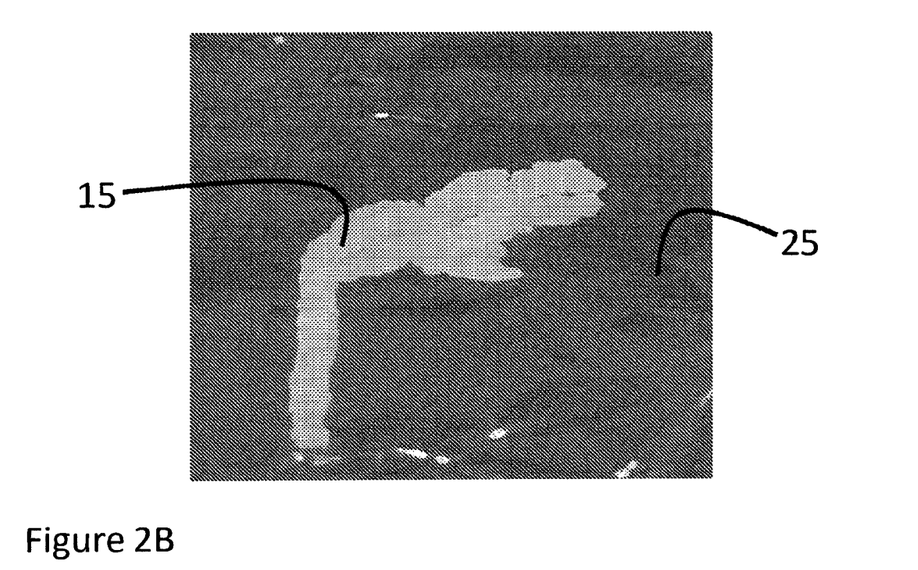
FIG. 2B is a photomicrograph illustrating that the composite composition of FIG. 2A maintains shape after being deposited onto a substrate.

Referring now to FIGS. 2A and 2B, a composite composition 15 may be extruded or applied to a substrate through a nozzle 20 to a substrate 25. The chopped dry CNF, CNC, or MFC absorb the thermoset resin, holding it with molecular forces. Mixing chopped, dry cellulose nanofibrils, nanocrystals, and/or micro-sized fibers with a liquid thermoset resin enables the resulting composite composition 15 to be processed in similar fashion to thermoplastic materials.

The composite compositions 15 formed according to the teachings of the present disclosure can be used in free-form manufacturing process, including but not limited to, 3-D printing. In 3-D printing, the incorporation of CNF and MFC into the composite composition interacts and works directly with the bulk of the thermoset resin. In comparison, the incorporation of CNC into the composite composition adds better surface finish to the printed parts.

Cellulosic fibers are highly hydrophilic materials because of their chemical nature. Therefore, utilization of these nano- and micro-sized fibers with water-based thermoset systems can result in stronger composite materials that can be printed. Also, instead of dried cellulose fibers, wet feedstock can also be used, thereby, saving energy and cost, as well as improving dispersion.

Figure 3:
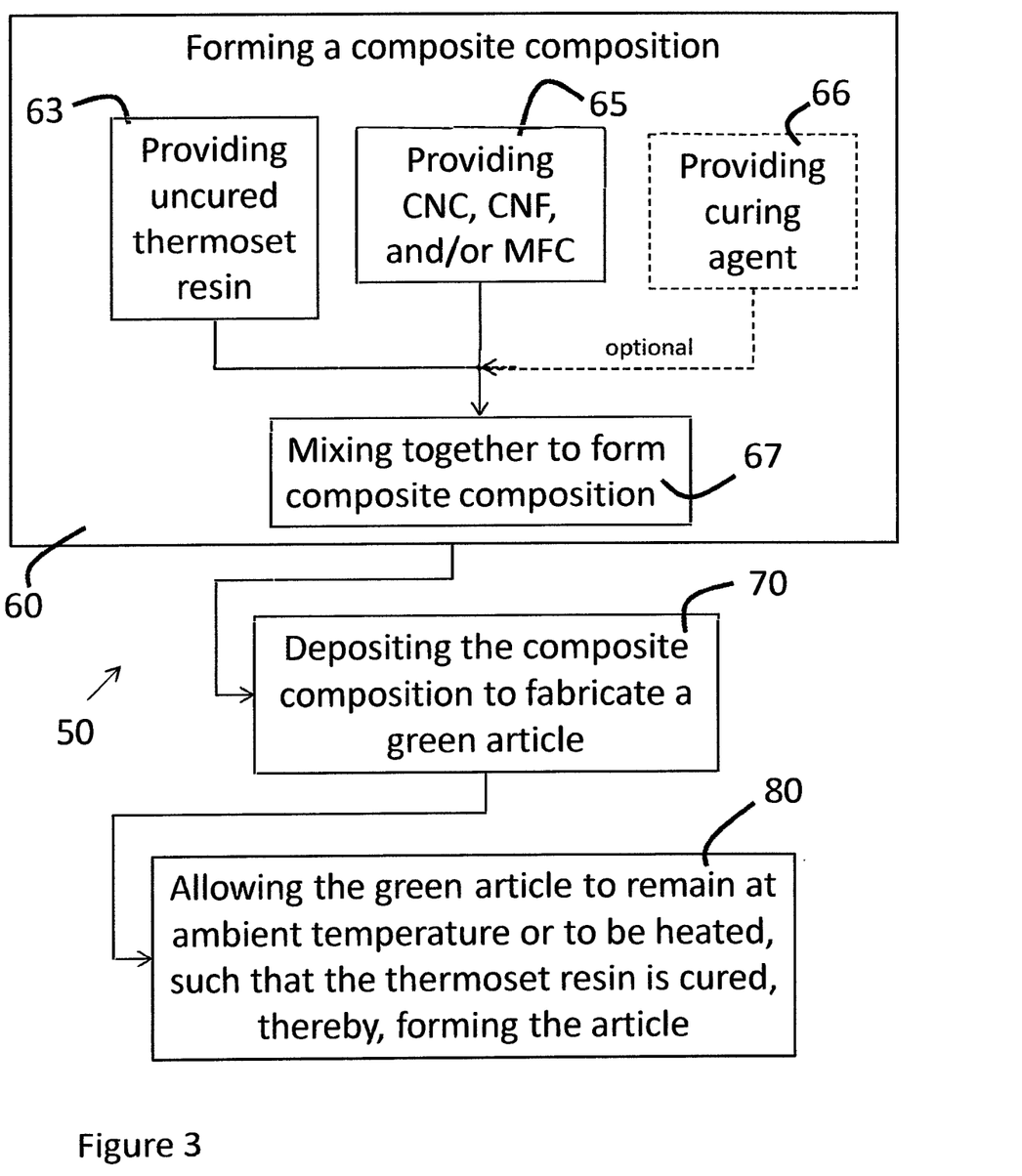
FIG. 3 is a schematic diagram of a method of making an article using the composite composition formed according to the teachings of the present disclosure.

According to another aspect of the present disclosure, a method of making an article that incorporates the composite composition is provided. Referring now to FIG. 3 the method 50 of making an article comprises the steps of: forming 60 a composite composition; depositing 70 the composite composition to fabricate a green article; and allowing the green article to remain at ambient or room temperature or heating 80 the green article to a predetermined temperature and for a predetermined time to at least partially cure the thermoset resin, thereby, making the article. The composite composition comprises an uncured thermoset resin as previously described above and further defined herein. The composite composition includes about 3 wt. % to about 35 wt. % of at least one material selected from the group consisting of cellulose nanofibrils (CNF), micro-sized cellulose fibers (MFC), and cellulose nanocrystals (CNC) dispersed therein as measured with respect to the overall weight of the composite composition.

The process step of forming 60 a composite composition may further comprise the steps of: providing 63 the uncured thermoset resin; providing 65 the CNC, CNF, MFC, or a mixture thereof; optionally, providing 66 a curing agent; and then mixing 67 the thermoset resin, the optional curing agent, and the nano- or micro-fibers together. The cellulose nanofibrils and/or nanocrystals may have an average diameter of about 5 nm to about 500 nm and an average aspect ratio in the range of about 5:1 to about 500:1. The cellulose micro-sized fibers may have an average diameter of about 5 µm to about 100 µm and an average aspect ratio in the range of about 5:1 to about 250:1.

The predetermined temperature and time associated with heating the green article formed from the composite composition is determined by the selection of the thermoset resin. The temperature and time are selected to be at least high enough or long enough to cause the thermoset resin to at least partially cure. Alternatively, the selected temperature and time is selected such that the thermoset resin is sufficiently or substantially cured.

The step of depositing 70 the composite composition to fabricate a green article may include, but not be limited to, the use of a 3-D printing process. The green article may comprise multiple layers of the composite composition that are shaped or molded into the green article. In this step, the composite composition can be processed and/or shaped with or without the inclusion of a curing agent.

According to another aspect of the present disclosure and article formed from the composite composition described above and further defined herein is provided. The composite composition in the article is at least partially cured. Alternatively, the composite composition in the article is substantially cured. When desirable, the composite composition may further include a curing agent.

The following specific examples are given to further illustrate the preparation and testing of the composite compositions formed according to the teachings of the present disclosure, as well as the composites formed therefrom, and should not be construed to limit the scope of the disclosure. Those skilled-in-the-art, in light of the present disclosure, will appreciate that many changes can be made in the specific embodiments which are disclosed herein and still obtain alike or similar result without departing from or exceeding the spirit or scope of the disclosure.

Example 1—Preparation of Composite Compositions

A total of 20.1 grams of an epoxy resin (Epon 828®, Hexion Specialty Chemicals, Houston, Tex.) was mixed with 5.3 grams of a polyamine adduct curing agent (Epikure Hexion Specialty Chemicals) and 1.6 grams of chopped, dry cellulose nanofibrils (CNF) using a roller blade shear mixer. The resulting composite composition was loaded into a syringe and extruded onto a surface as a bead. The bead maintained its form and another bead was deposited on top of the first bead in the fashion of a 3-D printing process. The second bead maintained its form and disposition on top of the first bead. When the material cured, the two beads could not be separated, indicating a level of adhesion that would be sufficient for 3-D manufacturing and other uses.

Example 2—Preparation of Composite Compositions for Mechanical and Rheological Property Testing Several composite compositions (R1-R7) were formed according to the procedure of Example 1. Each of the composite compositions (R1-R7) included different concentrations of cellulose nanofibers (CNF), cellulose nanocrystals (CNC) and/or micro-sized cellulose fibers (MFC) dispersed in an epoxy resin. The cellulose nanofibers utilized in this Example had a diameter of about 100 nm and an aspect ratio of about 10. The amount and type of CNF, CNC, and/or MFC used in each composite composition is provided in Table 1. The mechanical and rheological properties of the composite compositions (R1-R7) were tested along with the properties of one comparable formulation (C-1), which comprised pure Acrylonitrile butadiene styrene (ABS).

TABLE 1

| | | Fiber Concentration Mixed with Epoxy Resin | | |
|---|---|---|---|---|
| | | Micro-sized Cellulose Fibers | | Cellulose |
| | Thermoset Resin | wt. % | Diameter (μm) | Aspect Ratio | NanoFibers (wt. %) |
| R-1 | epoxy | 1 | 20 | 8 | 3 |
| R-2 | epoxy | 3 | 20 | 8 | 3 |
| R-3 | epoxy | 3 | 20-30 | 13-20 | 3 |
| R-4 | epoxy | 3 | 20-30 | 18-27 | 3 |
| R-5 | epoxy | x | x | x | 4 |
| R-6 | epoxy | 9 | 20 | 8 | x |
| R-7 | epoxy | 9 | 20-30 | 13-20 | x |
| C-1 | ABS | x | x | x | x |

Figure 4:
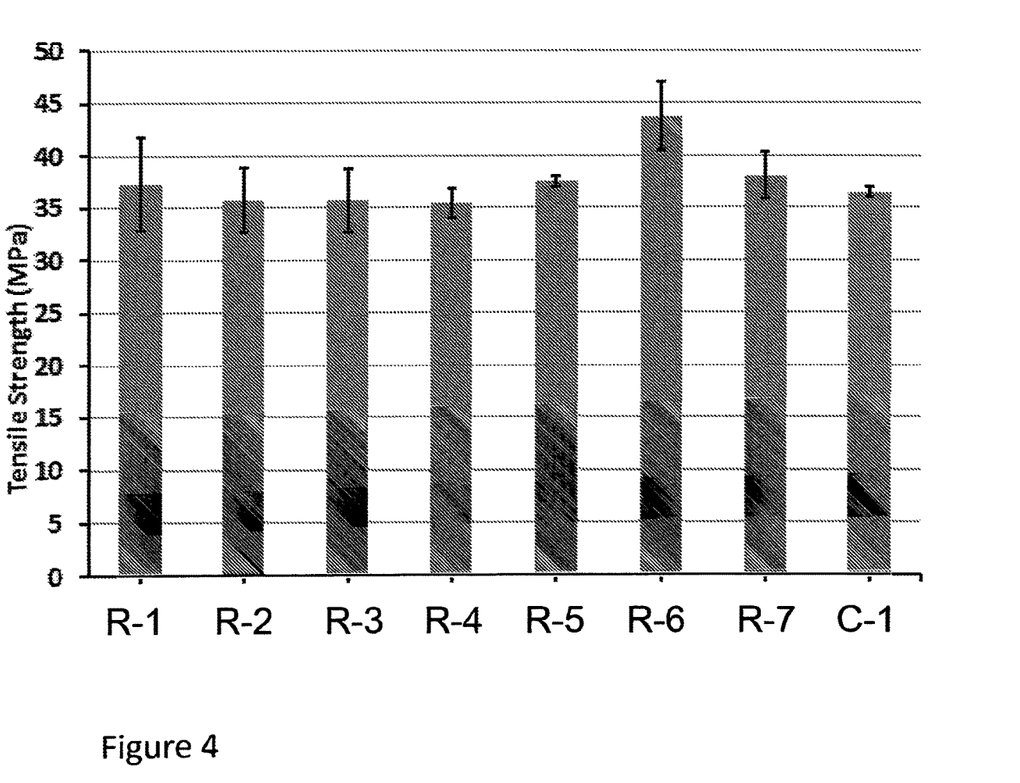
FIG. 4 is a graphical representation of the tensile strength (MPa) measured for different composite compositions formed according to the teachings of the present disclosure.

MECHANICAL PROPERTIES The test coupons or bars comprising the thermoset composite compositions (R-1 to R-7) were printed using a 3-D printer equipped with an air pressure-driven syringe pump in the direction of tensile testing. The comparative test coupons or bars (C-1) were printed using a similar desktop printer that incorporated a thermoplastic ABS filament as its feedstock. The test coupons were then cured initially at room temperature followed by an oven curing at 80° C. for 12 hours. The printed bars were cut-into ASTM D638 Type V dog-bone test bars or specimens using a template and a router. The dog-bone specimens were tested according to ASTM D638 standard (ASTM International, West Conshohocken, Pa.). The tensile strength of each coupon (R1-R7) was measured to be on the order of 35-45 MPa as shown in FIG. 4. It is important to note that the epoxy utilized in preparing the test coupons (R1-R7) is an epoxy system with moderate strength. Composite compositions can be formed using stronger epoxy systems, which will yield even significantly higher tensile strength values.

The tensile strength of the coupons (R1-R7) was compared to the tensile strength of an ABS coupon (C-1). The tensile strength of the test coupons (R1-R7) were found to be comparable to the tensile strength measured for the comparable ABS sample (C-1).

Figure 5:
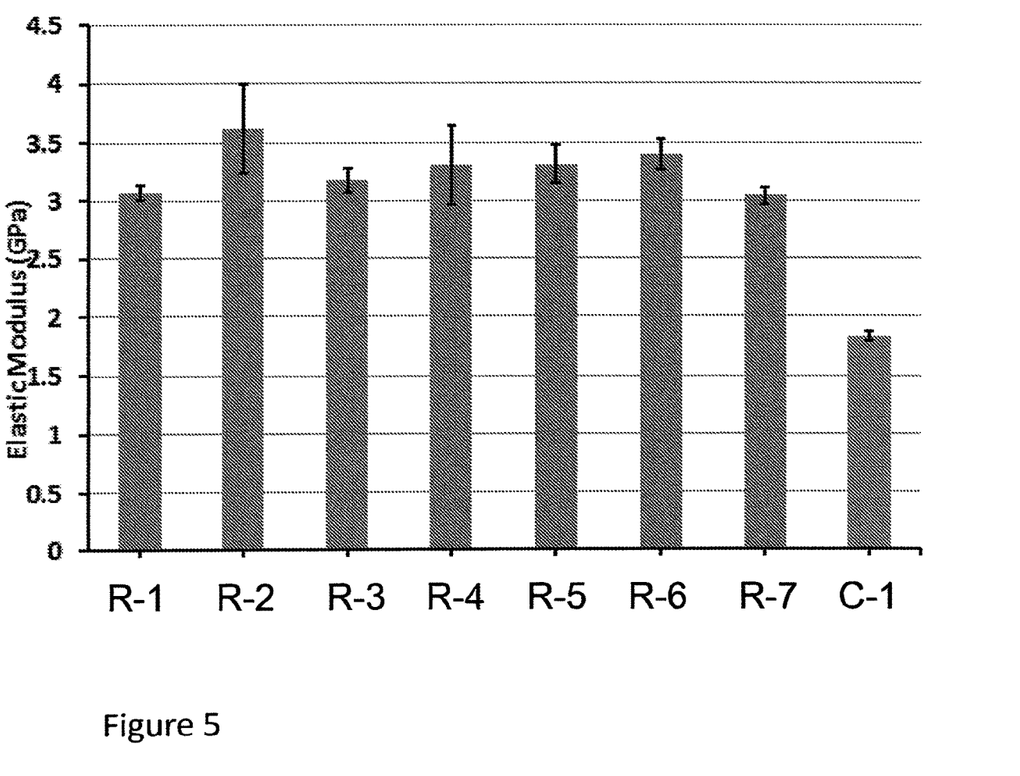
FIG. 5 is a graphical representation of the elastic modulus (GPa) measured for the composite compositions of FIG. 3.

The elastic modulus for the test coupons (R1-R7) was also measured and compared to the elastic modulus of the comparable sample (C-1) as shown in FIG. 5. The elastic modulus values measured for the 3-D printed composite compositions were in the range of 3.0 GPa to 3.6 GPa. In comparison, the elastic modulus of the ABS 3-D printed comparable sample (C-1) was on the order of about 1.7 GPa. Thus the composite compositions (R1-R7) of the present disclosure exhibit an elastic modulus that is at least approximately 2× greater than the elastic modulus of the comparable ABS sample (C-1). Thus the composite compositions (R1-R7) are significantly stiffer than the comparable sample (C-1).

The interlayer strength (i.e., z-strength), is one of the most critical aspects in additive manufacturing that needs to be improved. The incorporation of CNC, CNF, or MFC into a thermoset resin to form composite compositions will also significantly reduce this problem because the printed material is not cured until completely built. Because of this, the use of the composite compositions of the present disclosure solves the residual stress accumulation problem that is common encountered in FDM thermoplastic 3-D printing techniques.

Figure 6:
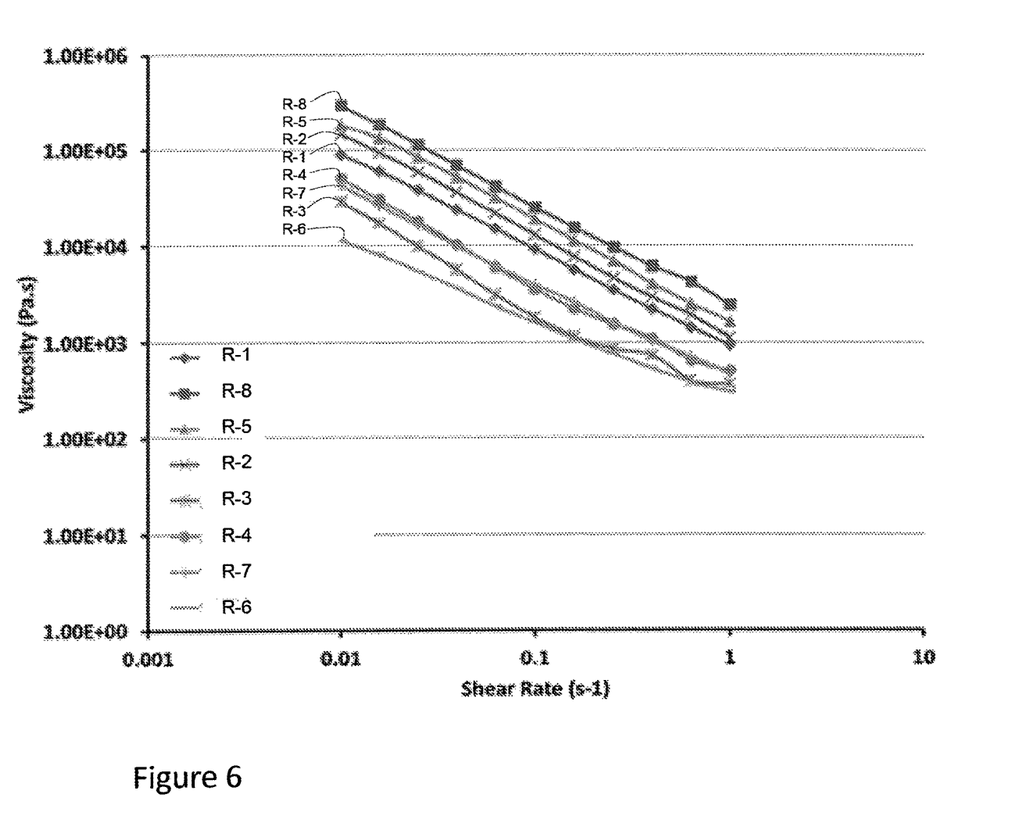
FIG. 6 is a graphical representation of the viscosity (Pa-s) measured for the composite compositions of FIG. 3 plotted as a function of shear rate (sec$^{-1}$).

RHEOLOGICAL ANALYSIS—In order to measure the viscosity exhibited by the composite compositions (R1-R7) that were printed using an air pressure-driven syringe pump, rheology tests were conducted as shown in FIG. 6. The viscosity of the composite compositions (R1-R7) was found to be shear thinning with a viscosity of about $1\times10^4$ Pa-sec to about $5\times10^6$ Pa-sec at a shear rate of 0.01 $\sec^{-1}$, which decreased to about $5\times10^2$ Pa-sec to about $5\times10^3$ Pa-sec at a shear rate of 1 $\sec^{-1}$. The 3-D printing of these composite compositions were carried out using an air-pressured syringe type deposition system in which the printed material was formulated into a paste form, due to the limited force that can be applied by the system.

One skilled in the art will understand that the viscosity of the composite compositions formed according to the teachings of the present disclosure are not limited to the range shown in FIG. 6, but may be higher when a greater CNC, CNF, and/or MFC concentration is incorporated into the composite composition. As the fiber loading is further increased in the composite compositions, the pastes turn into dough-textured materials that can be shaped or formed. At these high concentrations the materials gain further structural integrity which enables printing of much larger, sturdier pieces. In the case of composite compositions having higher cellulose concentrations, these composite compositions may be printed using mechanical extrusion/pumping systems, such as a screw type extrusion system or a metering pump.

Within this specification embodiments have been described in a way which enables a clear and concise specification to be written, but it in intended and will be appreciated that embodiments may be variously combined or separated without parting from the invention. For example, it will be appreciated that all preferred features described herein are applicable to all aspects of the invention described herein.

While there has been shown and described what are at present considered to be examples of the invention, it will be obvious to those skilled in the art that various changes and modifications can be prepared therein without departing from the scope of the inventions defined by the appended claims.

What is claimed is:

1. A method of making an article, the method comprising:
   forming a composite composition comprising an uncured thermoset resin and 3 wt. % to 35 wt. % of at least one material selected from the group consisting of cellulose nanofibrils (CNF), micro-sized cellulose fibers (MFC), and cellulose nanocrystals (CNC) dispersed therein as measured with respect to an overall weight of the composite composition, wherein the cellulose nanofibrils and/or the nanocrystals have an average diameter in a range of 5 nm to 500 nm and an average aspect ratio in a range of 5:1 to 500:1, wherein the cellulose micro-sized fibers have an average diameter in a range of 5 μm to 100 μm and an average aspect ratio in a range of 5:1 to 250:1;
   depositing the composite composition via a three-dimensional (3D) printing process to fabricate a green article comprising multiple layers of the composite composition; and
   curing the green article to form an at least partially cured article.

2. The method of claim 1, wherein the forming of the composite composition comprises:
   providing the uncured thermoset resin;
   providing the cellulose nanofibrils (CNF), the micro-sized cellulose fibers (MFC), and/or the cellulose nanocrystals (CNC); and
   mixing the thermoset resin with the CNF, MFC, and/or CNC to form the composite composition.

3. The method of claim 2, wherein the at least partially cured article comprises a tensile strength in a range of 35 MPa to 45 MPa.

4. The method of claim 2, wherein the at least partially cured article comprises an elastic modulus in a range of 3 GPa to 3.6 GPa.

5. The method of claim 2, wherein the curing is conducted at ambient temperature for a predetermined time.

6. The method of claim 2, wherein the curing comprises heating the green article to a predetermined temperature for a predetermined time.

7. The method of claim 2, wherein the forming of the composite composition further comprises:
   providing a curing agent; and
   mixing the thermoset resin and the curing agent when present with the CNF, MFC, and/or CNC to form the composite composition.

8. The method of claim 7, wherein the at least partially cured article comprises a tensile strength in a range of 35 MPa to 45 MPa.

9. The method of claim 7, wherein the at least partially cured article comprises an elastic modulus in a range of 3 GPa to 3.6 GPa.

10. The method of claim 7, wherein the curing is conducted at ambient temperature for a predetermined time.

11. The method of claim 7, wherein the curing comprises heating the green article to a predetermined temperature for a predetermined time.

12. The method of claim 7, wherein the curing agent comprises a polyamide, an amidoamine, an aliphatic amine, a cycloaliphatic amine, or a combination thereof.

13. The method of claim 1, wherein the composite composition comprises a thermoset resin selected from the group consisting of epoxy resins, vinyl ester resins, and polyester resins.

14. The method of claim 1, wherein the thermoset resin comprises an epoxy resin, and
   wherein the composite composition further comprises a curing agent.

15. The method of claim 14, wherein the curing agent comprises a polyamide, an amidoamine, an aliphatic amine, a cycloaliphatic amine, or a combination thereof.

16. The method of claim 1, wherein the at least partially cured article comprises a tensile strength in a range of 35 MPa to 45 MPa.

17. The method of claim 1, wherein the at least partially cured article comprises an elastic modulus in a range of 3 GPa to 3.6 GPa.

18. The method of claim 1, wherein the curing is conducted at ambient temperature for a predetermined time.

19. The method of claim 1, wherein the curing comprises heating the green article to a predetermined temperature for a predetermined time.

* * * * *